Figure 1:
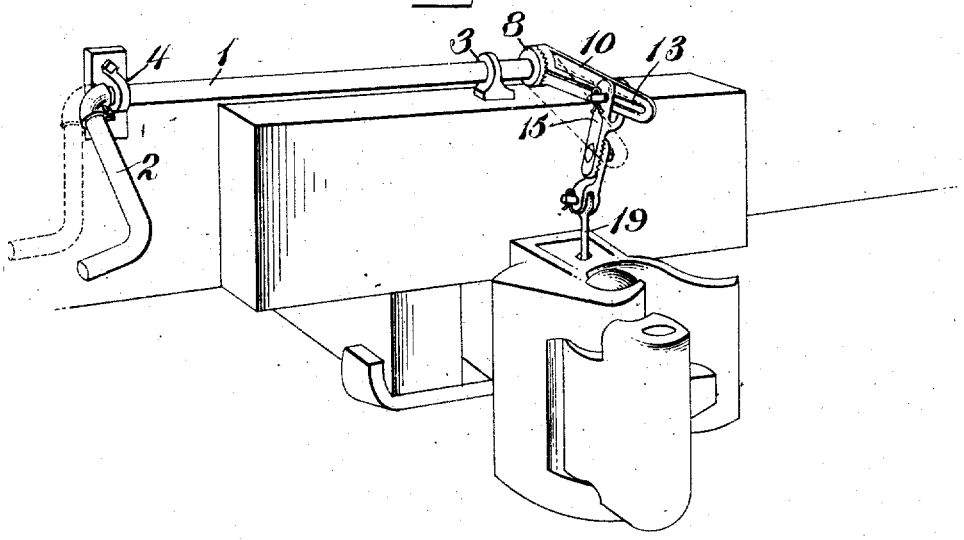

E. E. TURNEY.

OPERATING MECHANISM FOR AUTOMATIC CAR COUPLINGS.

APPLICATION FILED JUNE 4, 1907.

Reissued Oct. 26, 1909 13,030.

WITNESSES

Harry L. Lechner

J. C. Bradley

INVENTOR

Edgar E. Turney by his Atty

Paul Synnestvedt

UNITED STATES PATENT OFFICE.

EDGAR E. TURNEY, OF LIMA, OHIO, ASSIGNOR, BY DIRECT AND MESNE ASSIGNMENTS, TO THE DAYTON MALLEABLE IRON COMPANY, OF DAYTON, OHIO, A CORPORATION OF OHIO.

OPERATING MECHANISM FOR AUTOMATIC CAR-COUPLINGS.

13,030. Specification of Reissued Letters Patent. Reissued Oct. 26, 1909.

Original No. 812,385, dated February 13, 1906, Serial No. 285,374. Application for reissue filed June 4, 1907. Serial No. 377,284.

*To all whom it may concern:*

Be it known that I, EDGAR E. TURNEY, of Lima, county of Allen, and State of Ohio, have invented certain new and useful Improvements in Operating Mechanism for Automatic Car-Couplers; and I do hereby declare that the following is a full, clear, and exact description of the invention, which will enable others skilled in the art to which it appertains to make and use the same, reference being had to the accompanying drawings, and to the figures of reference marked thereon, which form part of this specification.

This invention relates to devices for operating automatic car-couplers; and it has for its object, to provide simple and effective means for adjusting the arm upon the operating-rod and also the connection between said arm and the lock-stem of the coupler.

The use of the ordinary one-piece operating-rod connected to the coupler-lock by a short chain has proven ineffective, owing to the fact that all cars have more or less free movement or slack in the rear end attachment of their couplers, and the ordinary rod and chain do not posses sufficient flexibility to permit such free movement.

In carrying out my invention I provide upon the operating-rod an arm capable of being adjusted thereon, and I provide said arm with an elongated slot whereby the connection between said arm and the lock-stem of the coupler has a movement to permit free movement of the cars without in the least affecting the efficient operation of the coupler-locking mechanism.

In carrying out my invention I employ the novel combination and arrangement of parts hereinafter shown, described and claimed.

Figure 2:
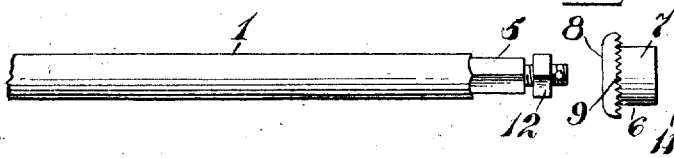
Figure 3:
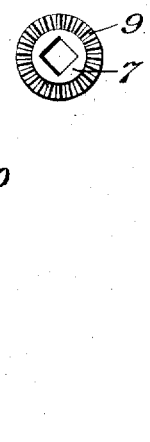
Figure 4:
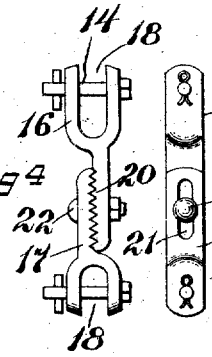
Figure 5:
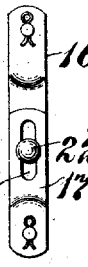

In the drawings,

Figure 1 is a perspective view showing my invention applied to the end of a car in position for operating an automatic car-coupler, Figure 2 is an elevation in detail of the inner end of the operating-rod, the bushing, and the adjustable arm, showing said parts as they appear before being assembled, Figure 3 is an end view of the bushing detached from the operating-rod, Figure 4 is a front view of the adjustable clevis, and Figure 5 is a side view of the clevis.

Referring to the parts, 1 is an operating-rod having the usual bent handle 2, and the same is mounted for operation upon castings 3 and 4. The inner end of the operating-rod is made non-circular and preferably square, as at 5, to receive thereon a bushing or sleeve 6, having a cylindrical portion 7, provided with a square axial perforation to fit on the square end of the rod, and also having a flanged portion 8, provided upon its face with serrations 9. 10 is an arm adapted to take a position upon the sleeve, the same being provided with serrations 11, meshing with the serrations 9 when the parts are assembled, a nut 12 on the end of the operating-rod securing the arm and bushing in position. The adjustment of the arm relative to the rod is readily accomplished by unscrewing the nut 12, the serrations upon the adjacent faces of the arm and the bushing being then disengaged. At the outer end of the arm 10 is provided a slot 13, adapted to receive a pin 14 at the upper end of the connecting-clevis 15. Clevis 15 comprises two substantially similar parts 16 and 17, respectively, each having a bifurcated portion 18, one for attachment to the end of the operating-arm and the other for attachment to the eye of the lock-stem 19 of the coupler. The faces of the parts 16 and 17 of the clevis are provided with transverse serrations 20, and each part also has a slot 21, through which a bolt 22 passes, the latter holding the clevis parts in rigid relation when adjusted to the proper length.

On assembling the parts the operating-arm and the serrated bushing are removed from the operating-rod, the latter then being readily placed in position by being inserted through the openings in the castings 3 and 4. The bushing 6 is then placed upon the end of the rod, and the operating-arm is placed upon the bushing and adjusted to the proper position, the nut 12 securing the same when adjusted. This arrangement is of obvious advantage over the one-piece operating-rod and arm, the latter being secured to the car with difficulty. The slot at the outer end of the arm 10, along which the adjustable clevis operates, permits the expansion and contraction of the draft-springs and supplies the requisite flexibility necessary for the free movement of the cars without affecting the coupler-operating mechanism. It is important to insure the flexibility above mentioned that the slot at the outer end of the operating-arm assume a nearly horizontal position when the coupler is locked, since the pin of the clevis would slide with difficulty along said slot were the latter inclined. In order that the arm may be adjusted to cause the slot therein to assume a nearly horizontal position, the clevis connecting the same with the coupler-lock is constructed so as to be conveniently adjustable in the direction of its length.

It will thus be seen that the parts are arranged to permit perfect flexibility during the operation of coupling the cars and that they are consequently relieved from undue strain and danger of breakage.

The utility of the invention will be apparent.

Having thus described my invention and illustrated its use, what I claim as new and desire to secure by Letters Patent is the following:

1. In a means for operating automatic car-couplers, the combination with the coupler-lock, of an operating-rod, a bushing secured against rotation upon said rod, an arm adjustable upon said bushing, and a clevis slidably connected with the outer end of said arm and connected at its lower end with the coupler-lock, substantially as described.

2. In a means for operating automatic car-couplers, the combination with the coupler-lock, of an operating-rod, a bushing secured against rotation upon said rod, an arm adjustable upon said bushing, and a clevis connecting the arm with the coupler-lock, said clevis being slidably carried at the outer end of said arm and having means for adjusting the same in the direction of its length, substantially as described.

3. In a means for operating automatic car-couplers, an operating-rod having a squared end, a bushing having a square perforation to fit upon said end and held against rotation thereon, said bushing having a flange provided with radial teeth, an arm mounted upon the bushing and also provided with radial teeth to engage the teeth upon the flange, said arm having an elongated slot at its outer end, a nut upon the rod to secure the arm when adjusted relative to the bushing, and a clevis connecting the slotted end of the coupler-arm with the coupler-lock, said clevis consisting of two parts having interengaging teeth to permit the same to be adjusted in the direction of their length, and means for securing said clevis parts in adjusted position, substantially as described.

4. In a means for operating automatic car-couplers, the combination with the coupler-lock, of an operating-rod, an arm secured to the operating-rod, and longitudinally slotted at its outer end and a connecting rod adjustable in length provided with a pin at its upper end engaging the slot in the arm.

5. In a means for operating automatic car-couplers, the combination with the coupler-lock, of an operating rod, a bushing secured against rotation upon said rod, an arm adjustable upon said bushing, and a member slidably connected with the outer end of said arm and connected at its lower end with the coupler-lock, substantially as described.

In testimony whereof I have hereunto signed my name in the presence of the two subscribed witnesses.

EDGAR E. TURNEY.

Witnesses:
G. R. Davisson,
M. A. Parker.